United States Patent Office 3,345,269
Patented Oct. 3, 1967

3,345,269
PROCESS FOR THE PRODUCTION OF
PROTEOLYTIC ENZYMES
Bengt Adolf von Hofsten, Uppsala, Sweden, assignor to Aktiebolaget Astra, Sodertalje, Sweden, a company of Sweden
No Drawing. Filed Apr. 9, 1965, Ser. No. 447,049
Claims priority, application Sweden, Apr. 14, 1964, 4,562/64
8 Claims. (Cl. 195—66)

ABSTRACT OF THE DISCLOSURE

A method is disclosed for preparing protein degrading enzymes through the culture of microorganisms of the genus Arthrobacter under aerobic conditions. The microorganisms are cultivated for this purpose on a proteinaceous substrate of proteins or peptides plus the usual nutritive salts, the culture medium being relatively free of carbohydrates. The enzyme is found in the cell-free culture medium following culture.

---

The present invention concerns a process for the production of a proteolytic enzyme from bacteria.

As is well known, proteolytic enzymes catalyze the degradation of proteins to peptides and/or amino acids. A number of such enzymes are known which may be recovered from animal or plant sources such as papain, pepsin, ficin, etc. More or less purified enzyme preparations, such as the foregoing, are used in the food industry, leather industry and textile processing, and in other industries depending to greater or lesser extent upon the treatment of naturally occurring proteinaceous materials. In addition, some proteolytic enzymes have acquired widespread use in the medical arts, and have been important tools in some types of scientific research.

During recent years considerable effort has been made to isolate proteolytic enzymes from cultures of microorganisms because proteolytic enzymes derived from such sources have been found to have particularly good stability and other properties which make them more useful than extracts from animal or plant sources. The present invention is concerned with the production of an enzyme of this type.

In accordance with the present invention, it has been found that the protein degrading bacteria of the genus Arthrobacter are useful for the production of proteolytic enzymes. Most species of this genus are believed to be effective in the present invention. The species Arthrobacter ureafaciens is especially useful in the present invention. A typical strain of this species is listed under ATCC 7562, although it is to be understood that the present invention is not limited to the use of this strain. All known strains of the species A. ureafaciens may be used as well as most other species of the Arthrobacter genus.

This bacterial genus, the systemic position of which is somewhat unclear, comprises certain different soil organisms which are described under nine species in Bergey's "Manual of Determinative Bacteriology," Seventh Edition, 1957. Some of these species had been earlier described as belonging to the genus Corynebacterium. However, it has been pointed out by E. G. Mulder (Ann. Inst. Pasteur, vol. 104, page 46, 1963), that the border line between these species had been confused and it was recognized that certain microorganisms, formerly described as belonging to the genus Corynebacterium are properly classified as belonging to the genus Arthrobacter. It will be understood, therefore, that in the following description of the present invention, the bacteria of the genus Arthrobacter are those described in the aforementioned Bergey's manual, and the paper E. G. Mulder.

As is characteristic of bacteria of the Arthrobacter genus, including Arthrobacter ureafaciens, young cultures of this genus consist of Gram-negative or Gram-variable, rod-formed cells, which, when cultured on an agar-substrate, often form yellowish pigments. In older cultures mainly coccoid cells appear. Arthrobacter strains are typically non-motile and obligately aerobic.

The Arthrobacter may be cultured on the substrates routinely used in bacteriological studies. These substrates are composed of carbohydrates and nutrient inorganic elements and may contain proteins such as peptones, meat extract, or the like.

In accordance with the present invention, it has been found that when protein degrading bacteria of the genus Arthrobacter, such as A. ureafaciens, are cultured on an appropriate substrate, high yields of a proteolytic enzyme are obtained. The resulting enzyme is exceptionally stable and exhibits good proteolytic activity at pH values in the range of 3 to 11. The culture medium used in the present invention consists essentially of from about 1% to 5% proteins, such as meat extracts and peptones, together with the usual mineral elements necessary for maximum growth, the balance of the substrate being water. Preferably, the culture medium contains about 1% to 2% proteins. Typical proteins and peptones which may be used includes casein, liver extract, beef extract, peptonized meat extracts, peptonized casein, heart extracts, gelatin, milk proteins and the like. Several of the foregoing are particularly preferred because of the ease with which the enzyme can be recovered from the culture medium. Among these, the use of peptones, meat extract and milk proteins may be especially mentioned.

When using peptonized proteins, care should be taken that the peptone is relatively free of free amino acids. The presence of protein degradation products of low molecular weight, such as free amino acids, depresses the enzyme formation. For the same reason, the presence of acid hydrolyzed proteins is undesirable since these also contain primarily free amino acids.

It is important that the culture medium be relatively free of carbohydrates. Normally less than 1% carbohydrates should be present in the culture medium based on the total weight thereof. Accordingly, the addition of carbohydrates to the culture medium should be avoided. It may be noted that in carbohydrate-containing nutrient substrates, the Arthrobacter are known to grow without difficulty. However, if the medium contains substantial amounts of carbohydrates, significant proteolytic enzyme production is not obtained.

For most effective growth, the culture medium should also contain suitable amounts of mineral salts as is well known in the art. In this connection, it should be mentioned that potassium phosphate and magnesium sulfate are particularly valuable in promoting the maximum production of enzymes. Other mineral ions known to be valuable in promoting the growth of microorganisms include iron, zinc, copper, manganese and calcium.

Cultivation should be at a temperature between about room temperature and 40° C. Preferably, the temperature should not exceed the maximum growth temperature of the microorganism which usually is approximately 30° C.

The pH of the culture medium affects the production of enzymes. For the production of proteolytic enzymes in accordance with the present invention, it is preferred that the pH be between about 6.0 and 8.5. The optimum pH for the Arthrobacter bacteria is about 7.5. The pH may be adjusted by the addition of known buffer systems to the substrate or by the addition of an acid or an alkali.

As mentioned, the bacteria of the Arthrobacter genus are obligately aerobic. Accordingly, it is necessary to provide an adequate supply of air to the culture medium, such as by bubbling air through it or blowing air over its surface (if it is sufficiently agitated). In order to prevent foaming, especially as a result of aeration or agitation, in the preferred embodiments of this invention, an anti-foaming agent is added because foaming may inactivate the enzyme. Typical anti-foaming agents are naturally occurring oils, such as olive oil, and silicone oils.

Proteolytic enzyme activity may be determined by one or more of several methods which have been described in the literature. For instance, the activity of an enzyme in degrading proteins may be determined by following the formation of degradation products which are soluble in a 5% to 10% solution of trichloroacetic acid or with the aid of titrimetric methods. Since most of the proteolytic enzymes are able to coagulate milk, the time for this reaction being inversely proportional to the amount of enzyme, the rate of coagulation of milk also may be used for determining enzyme activity. A number of such methods are described in "Methods in Enzymology," vol. II, by Colowick and Kaplan (Academic Press, 1952). It should be noted that to compare the activity of different types of enzymes by these methods may be inconclusive because different enzymes may have different specificities or require special metal ions or different pH's for optimum activity.

An examination of the proteolytic activity of enzymes obtained from cultures of bacteria of the Arthrobacter genus cultivated on proteinaceous substrates shows that the proteolytic activity first appears during the active growth phase of the microorganism. With the passage of time a maximum enzyme activity is reached and preferably, the cultivation of the organism should be discontinued at about the time of maximum enzyme activity. However, it has been found that the stability of the enzyme is so great that only a small decrease in enzyme activity occurs if cultivation is continued for a longer time than necessary to reach the maximum activity. Accordingly, it is not essential that cultivation be discontinued at exactly this time. Depending upon the composition of the substrate, the cultivation temperature and the amount of inoculation material, the maximum enzyme activity is usually reached after cultivation for one to two days.

Practically all enzyme activity is found in the culture fluid after centrifugation of the cells which shows that the enzyme is extra-cellular. Accordingly, after cultivation has been completed, the bacteria may be removed from the culture with the aid of centrifugation or other convenient methods. If so desired, the bacteria may, of course, be collected for the extraction of intra-cellular enzymes.

The extra-cellular enzyme remaining in the solution is purified. Because of its great stability, several different methods are possible. For some purposes, the enzyme may be used directly, i.e. without purification, or it may be used after removal of the water, for instance, by freeze-drying. A first concentration of the enzyme may also be obtained by precipitation or adsorption methods.

Subsequent purification of the enzyme depends upon the composition of the substrate and contaminating substances. A number of conventional methods are known for this purpose, especially chromatographic techniques and electrophoresis. If it is desired to isolate the enzyme in crystalline form it may be crystallized in the presence of ammonium sulfate or acetone after the contaminants have been removed. The resulting crystals are characteristically needle-like.

The following example is intended to illustrate the invention. However, the experimental conditions stated herein are not to be taken as limiting the present invention. The activity of the proteolytic enzyme was determined by the method described by L. Gorini and G. Lanzavecchia (Biochim. Bio-phys. Acta, vol. 14, page 407, 1954), which is based upon the time required for the proteolytic enzyme being tested to coagulate milk. In accordance with this method, 0.5 ml. of an enzyme containing solution is mixed with 5 ml. of a milk solution which has been heated to 37° C. The milk solution contains 1% milk powder and 0.03 M calcium chloride, and is buffered to a pH of 8.0 with 0.1 M of tris(hydroxymethyl)aminomethane-HCl. The mixture is incubated at 37° C. and the time required to coagulate the milk solution is observed. The number of enzyme units ($u$) per milliliter of enzyme solution is calculated according to the following formula:

$$u = \frac{1000}{t-k}$$

where $t$ is the cogulation time in seconds and $k$ is a constant equal to the time for coagulation with an infinite concentration of enzyme. The constant must be determined for different types of enzymes and conditions of assay. For the enzyme tested in the following example, $k$ is 9 seconds.

Example

A substrate consisting of 100 grams of gelatin, 10 grams of peptone, 10 grams of potassium monohydrogenphosphate, 1 gram of magnesium sulfate, 100 milligrams of calcium chloride, 5 milligrams of ferrous sulfate, and 10 milliliters of olive oil in 10 liters of distilled water was prepared. The substrate was transferred to a cultivation vessel furnished with a stirrer and means for aeration, and autoclaved at 120° C. for 30 minutes.

After cooling to 30° C., 100 ml. of an inoculation culture of *A. ureafaciens* was added. The culture had been obtained by cultivating the microorganism on a shaking-table in the above-described substrate at 30° C. for 24 hrs.

The culture was incubated at 30° C. During incubation, 5 liters per minute of sterile air were supplied to the culture medium and the medium was stirred with such force that a vortex was formed.

After about 24 hrs. a sample of the culture medium was taken and centrifuged to remove the cells. The sample contained about 50 enzyme units per milliliter. A second sample taken after continued incubation for an additional 5 hour period showed that no significant change in enzyme activity had occured. After centrifugation of the culture medium it was found to contain a total of 500,000 enzyme units.

I claim:

1. A process for the production of a proteolytic enzyme comprising the steps of cultivating protein degrading bacteria of the genus Arthrobacter under aerobic conditions in a water solution consisting essentially of proteinaceous substances and nutritive salts, said proteinaceous substances being selected from the group consisting of proteins and peptides, separating said bacteria from the culture medium and recovering the cell-free culture medium with the enzyme formed under cultivation.

2. A process for the production of a proteolytic enzyme comprising the steps of cultivating a protein degrading bacteria of the genus Arthrobacter in a water solution consisting essentially of from 1% to 5% by weight of proteinaceous substances and nutritive salts, said proteinaceous substances being selected from the group consisting of proteins and peptides, the cultivation being carried out at a pH between about 6.5 and 8 and at a temperature below about 40° C.

3. A process according to claim 2 in which said protein degrading bacteria is *Arthrobacter ureafaciens*.

4. A process according to claim 2 in which the temperature of the culture medium does not exceed the maximum growth temperature of the strain employed.

5. A process according to claim 2 in which the culture medium contains from about 1% to about 2% of said proteinaceous substances.

6. A process according to claim 2 wherein the culture medium contains less than about 1% carbohydrates.

7. A process according to claim 2 in which the cultivation is carried out at a pH of about 7.5 and at a temperature of about 30° C.

8. A process according to claim 2 wherein said nutritive salts include potassium phosphate and magnesium sulfate.

References Cited

UNITED STATES PATENTS 3,031,380    4/1962    Minagawa et al. _____ 195—66
3,127,327    3/1964    Nomoto et al. _____ 195—62

A. LOUIS MONACELL, *Primary Examiner.*

L. M. SHAPIRO, *Assistant Examiner.*